(12) United States Patent
Fu

(10) Patent No.: US 11,169,827 B2
(45) Date of Patent: Nov. 9, 2021

(54) RESOURCE LOADING AT APPLICATION STARTUP USING ATTRIBUTES OF HISTORICAL DATA GROUPS

(71) Applicant: TENCENT TECHNOLOGY (SHENZHEN) COMPANY LIMITED, Shenzhen (CN)

(72) Inventor: Liuqiang Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 142 days.

(21) Appl. No.: 16/368,451

(22) Filed: Mar. 28, 2019

(65) Prior Publication Data

US 2019/0220293 A1    Jul. 18, 2019

Related U.S. Application Data

(63) Continuation of application No. PCT/CN2017/107457, filed on Oct. 24, 2017.

(30) Foreign Application Priority Data

Dec. 19, 2016 (CN) .......................... 201611184027.6

(51) Int. Cl.
  *G06F 9/44* (2018.01)
  *G06F 9/445* (2018.01)

(52) U.S. Cl.
  CPC .......... *G06F 9/44578* (2013.01); *G06F 9/445* (2013.01)

(58) Field of Classification Search
  CPC .............................. G06F 9/44578; G06F 9/445
  See application file for complete search history.

(56) References Cited

U.S. PATENT DOCUMENTS

| 8,949,420 B2 * | 2/2015 | Banavar ................. H04L 29/06 709/225 |
| 2010/0174735 A1 * | 7/2010 | Fiatal .................... G06F 16/148 707/769 |

(Continued)

FOREIGN PATENT DOCUMENTS

| CN | 102104666 A | 6/2011 |
| CN | 104168336 | 11/2014 |

(Continued)

OTHER PUBLICATIONS

Chinese Office Action dated Nov. 28, 2019 in Chinese Patent Application 201611184027.6, with partial English translation, citing references AO-AU herein (12 pages).

(Continued)

*Primary Examiner* — Benjamin C Wu
(74) *Attorney, Agent, or Firm* — Oblon, McClelland, Maier & Neustadt, L.L.P.

(57) ABSTRACT

An electronic device includes a memory and processing circuitry. The memory is to be loaded with resources for applications to be executed at the electronic device. The processing circuitry obtains a current data group having attributes for a current running scene. Further, the processing circuitry obtains historical data groups respectively corresponding to a plurality of historical scenes. A historical data group of the historical data groups includes corresponding attributes to the attributes for a historical running scene. Then, the processing circuitry calculates similarities respectively for the historical data groups to the current data group, and determines a historical scene from the plurality of historical scenes based on the similarities. In addition, the processing circuitry determines a potential application for the current running scene. The potential application was executed in the determined historical scene. Then, the pro- (Continued)

cessing circuitry loads a resource for the potential application into the memory.

18 Claims, 7 Drawing Sheets

(56) References Cited

U.S. PATENT DOCUMENTS

| | | | | |
|---|---|---|---|---|
| 2011/0306304 | A1* | 12/2011 | Forutanpour | H04W 4/021 455/67.11 |
| 2013/0124848 | A1* | 5/2013 | Fried | G06F 3/038 713/100 |
| 2013/0173513 | A1* | 7/2013 | Chu | G06F 9/451 706/14 |
| 2013/0346012 | A1* | 12/2013 | Lee | G01D 9/005 702/127 |
| 2014/0280131 | A1* | 9/2014 | Martens | G06F 16/9535 707/736 |
| 2014/0372356 | A1* | 12/2014 | Bilal | G06F 9/44578 706/46 |
| 2015/0026415 | A1* | 1/2015 | Clausen | H04L 29/08 711/137 |
| 2015/0106656 | A1* | 4/2015 | Bian | G06F 11/079 714/37 |
| 2015/0208219 | A1* | 7/2015 | Bowers | H04L 67/02 455/414.3 |
| 2018/0097905 | A1* | 4/2018 | Todasco | H04L 67/2847 |
| 2019/0042071 | A1* | 2/2019 | Gandhi | H04L 67/22 |
| 2019/0050338 | A1* | 2/2019 | Tian | G06F 16/9574 |
| 2019/0087205 | A1* | 3/2019 | Guday | G06T 11/60 |
| 2019/0220293 | A1* | 7/2019 | Fu | G06F 9/445 |
| 2020/0145385 | A1* | 5/2020 | Chauhan | H04L 67/02 |

FOREIGN PATENT DOCUMENTS

| | | |
|---|---|---|
| CN | 104168670 | 11/2014 |
| CN | 105335178 | 2/2016 |
| CN | 105431822 | 3/2016 |
| CN | 105677025 A | 6/2016 |
| CN | 105701108 | 6/2016 |
| CN | 105939416 A | 9/2016 |
| CN | 106055369 A | 10/2016 |
| CN | 106228179 A | 12/2016 |
| EP | 2579153 | 4/2013 |

OTHER PUBLICATIONS

International Search Report dated Jan. 29, 2018 in PCT/CN2017/107457 filed Oct. 24, 2017. (with English translation).

Written Opinion dated Jan. 29, 2018 in PCT/CN2017/107457 filed Oct. 24, 2017.

Chinese Office Action dated Nov. 24, 2020 in Chinese Application No. 201611184027.6 (with Concise English Translation).

* cited by examiner

RESOURCE LOADING AT APPLICATION STARTUP USING ATTRIBUTES OF HISTORICAL DATA GROUPS

RELATED APPLICATION

This application is a continuation of International Application No. PCT/CN2017/107457, filed on Oct. 24, 2017, which claims priority to China Patent Application No. 201611184027.6, filed with the Chinese Patent Office on Dec. 19, 2016 and entitled "STARTUP RESOURCE LOADING METHOD AND APPARATUS". The entire disclosures of the prior applications are hereby incorporated by reference in their entirety.

FIELD OF THE TECHNOLOGY

Embodiments of this application relate to the field of mobile terminals, and in particular, to a startup resource loading method and apparatus.

BACKGROUND OF THE DISCLOSURE

Along with the popularization and development of mobile terminals, the number and types of applications in a mobile terminal are increasingly rich, and a user may install and use various applications by using the mobile terminal.

When a user uses an application, the application needs to be started up by triggering the mobile terminal. In the related technology, after the user clicks on an icon of an application in a mobile terminal, and the mobile terminal receives a click operation of the user, to start up the application, a startup resource needed when the application is started up needs to start to be loaded. The startup resource includes: code of the application, a user interface (UI) material needed when the application runs, data that needs to be processed when the application runs, and the like.

For an application such as a game application, a drawing application, or an email application, because relatively many startup resources need to be loaded during startup, a relatively long time needs to be cost from a time point when the mobile terminal receives the click operation of the user to a time point when the application is completely started up.

SUMMARY

To resolve a problem that a relatively long time is cost from a time point when a mobile terminal receives a click operation of a user to a time point when an application is completely started up, embodiments of this application provide a startup resource loading method and apparatus.

Aspects of the disclosure provide methods and apparatus for preloading resources for applications in an electronic device (e.g., a terminal device, a mobile device). The electronic device includes a memory and processing circuitry. The memory is to be loaded with resources for applications to be executed at the electronic device. The processing circuitry obtains a current data group that includes one or more attributes for a current running scene at the electronic device. Further, the processing circuitry obtains historical data groups respectively corresponding to a plurality of historical scenes. A historical data group of the historical data groups includes corresponding attributes to the one or more attributes for a historical running scene at the electronic device. Then, the processing circuitry calculates similarities respectively for the historical data groups to the current data group, and determines a historical scene from the plurality of historical scenes based on the similarities of the corresponding historical data groups to the current data group. In addition, the processing circuitry determines a potential application for the current running scene. The potential application was executed in the determined historical scene. Then, the processing circuitry loads a resource for the potential application into the memory of the electronic device.

In some embodiments, the processing circuitry respectively calculates the similarities for the historical data groups to the current data group based on a similarity model.

In an example, the processing circuitry selects, from the plurality of historical scenes, a subset of the historical scenes with the corresponding historical data groups having similarities greater than a threshold. In another example, the processing circuitry selects N historical scenes with the corresponding historical data groups having the largest similarities to the current data group, and N is a positive integer.

In some embodiments, the current data group includes at least one attribute from user attributes, environment attributes and electronic device attributes. The user attributes includes at least one of a name, a gender, an age, a career, a mood, and an education background of a user of the electronic device. The environment attributes include at least one of a time, a location, a weather condition, humidity, illumination, a sound, and a traffic condition for the electronic device. The electronic device attributes include at least one of a terminal identifier, network information, and a device type of the electronic device.

In some embodiments, the processing circuitry respectively calculates sub-similarities of the at least two attributes to the corresponding attributes, and calculates a weighted sum of the sub-similarities to determine the similarity of the current data group to the historical data group.

In some examples, the processing circuitry calculates the weighted sum according to:

$$\mathrm{Sim}(C1,C2) = \sum_{i=1}^{n} \mathrm{Sim}(S_i, S_j) * p_i$$

where C1 denotes the current data group, C2 denotes the historical data group, Sim (C1, C2) denotes the similarity between the current data group and the historical data group, n denotes a number of attributes in the current data group, $S_i$ denotes an ith attribute in the current data group, $p_i$ denotes a weight corresponding to the ith attribute, $S_j$ denotes corresponding attribute in the historical data group to the ith attribute, Sim ($S_i$, $S_j$) denotes a sub-similarity of the ith attribute, n≥2, and n is a positive integer.

In an example, when an attribute is represented by a value, the processing circuitry calculates a sub-similarity according to:

$$\mathrm{Sim}(S_i, S_j) = 1 - \frac{|S_i - S_j|}{S_j}$$

where $S_i$ denotes an ith attribute in the current data group, $S_j$ denotes a corresponding attribute in the historical data group to the ith attribute, Sim ($S_i$, $S_j$) denotes the sub-similarity of the ith attribute in the current data group to the corresponding attribute in the historical data group.

In another example, when an attribute is represented by a range, the processing circuitry calculates a sub-similarity according to:

$$Sim(S_i, S_j) = 1 - \frac{|r_i^s - r_j^s|}{2r_j^s} - \frac{|r_i^e - r_j^e|}{2r_j^e}$$

where $S_i$ denotes an ith attribute in the current data group and is in a range of $[r_i^s, r_i^e]$, $r_i^s$ is a minimum value of $S_i$, $r_i^e$ is a maximum value of $S_i$, $S_j$ denotes a corresponding attribute in the historical data group to the ith attribute and is in a range of $[r_j^s, r_j^e]$, $r_j^s$ is a minimum value of $S_j$, and $r_j^e$ is a maximum value of $S_j$, Sim $(S_i, S_j)$ denotes the sub-similarity of the ith attribute in the current data group to the corresponding attribute in the historical data group.

In another example, when an attribute is represented using coordinates, the processing circuitry calculates a sub-similarity according to:

$$Sim(S_i, S_j) = 1 - \sqrt{(x_i - x_j)^2 + (y_i - y_j)^2}$$

where $S_i$ denotes an ith attribute in the current data group and has coordinates $(x_i, y_i)$, $S_j$ denotes a corresponding attribute in the historical data group to the ith attribute and has coordinates $(x_j, y_j)$, and Sim $(S_i, S_j)$ denotes the sub-similarity of the ith attribute in the current data group to the corresponding attribute in the historical data group.

In some embodiments, the processing circuitry 10 selects N historical scenes with the corresponding historical data groups having the largest similarities to the current data group, and N is a positive integer. Then, the processing circuitry determines recommendation weights of N historical applications respectively associated with the N historical scenes according to the similarities respectively corresponding to the N historical scenes. Further, the processing circuitry obtains a current application already in a running state and determines respective probabilities of the historical applications in association with the current application. A probability of a historical application represents a probability of performing a startup of the historical application in a running process of the current application. Then, the processing circuitry determines, from the N historical applications, P historical applications with largest products of the recommended weights and the corresponding probabilities, and P is an integer greater than or equal to 1.

In an embodiment, the processing circuitry generates the current data group based on collected data of the current running scene at the electronic device using at least one of data cleaning, data integration, data reduction, data transformation and semantic analysis.

According to an aspect of the disclosure, the processing circuitry also trains an initial similarity model to obtain the similarity model. In some examples, the processing circuitry obtains at least one historical scene sample pair. A historical scene sample pair includes historical data groups respectively corresponding to two historical scenes and a similarity value that is calculated according to a similarity of historical applications executed at the two historical scenes. Then, the processing circuitry trains the initial similarity model according to the at least one historical scene sample pair, to obtain the similarity model.

In some embodiments, the processing circuitry receives a signal indicative of an application that is started in the current running scene. When the application is different from the potential application, the processing circuitry updating weights in the similarity model according to the current data group and the application.

Aspects of the disclosure also provide a non-transitory computer-readable medium storing instructions which when executed by a computer cause the computer to perform the method of preloading resources for applications.

The technical solutions provided in the embodiments of this application have the following beneficial effects:

A current scene data group corresponding to a current scene is obtained, and historical scene data groups respectively corresponding to a plurality of historical scenes are obtained. Then, a similarity between the current scene and each of the historical scenes is calculated according to the current scene data group and the historical scene data groups. Then, a historical scene whose similarity with the current scene satisfies a set condition is determined, and a prediction application corresponding to the current scene is determined according to a historical application corresponding to the historical scene, the historical application being an application run in the historical scene. At last, a startup resource of the prediction application is preloaded to a memory. Because there is a relatively large probability for a mobile terminal to start up a same application in a similar scene, the mobile terminal may predict a historical application corresponding to a historical scene with a relatively high similarity as a prediction application to be started up by the mobile terminal and preload a startup resource needed when the prediction application is started up to a memory. In this way, when the mobile terminal receives a click operation of a user, the mobile terminal may directly use the preloaded startup resource to start up the prediction application, avoiding that the mobile terminal starts to load the startup resource to start up the prediction application only after receiving the click operation of the user, thereby reducing a time cost by the mobile terminal to start up the application.

BRIEF DESCRIPTION OF THE DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from these accompanying drawings.

DESCRIPTION OF EMBODIMENTS

To make the objectives, technical solutions, and advantages of this application clearer, the following further describes implementations of this application in detail with reference to the accompanying drawings.

A startup resource loading method provided in the embodiments of this application may be implemented by a mobile terminal such as a smartphone, a tablet computer, an e-book reader, a moving picture experts group audio layer III (MP3) player, and a moving picture experts group audio layer IV (MP4), and an application is installed in the mobile terminal.

Figure 1:
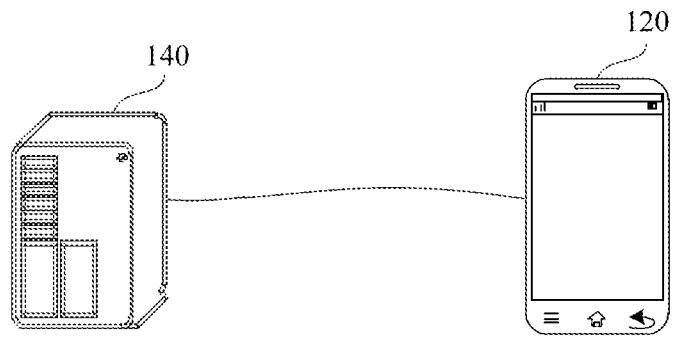
FIG. 1 is a schematic structural diagram of an implementation environment according to various embodiments of this application.

An implementation environment of a startup resource loading method described in the embodiments of this application may also be shown in FIG. 1. The implementation environment may include a mobile terminal 120 and a server 140.

The mobile terminal 120 may be connected to the server 140 by using a wireless network.

The server 140 is a server or a server cluster or cloud computing center consisting of a plurality of servers, and the server 140 has a model training function.

The foregoing wireless network may use a standard communication technology and/or protocol. A network may be usually the Internet but may alternatively be any network, including but being not limited to, any combination of a local area network (LAN), a metropolitan area network (MAN), a wide area network (WAN), a mobile network, a wired network, a wireless network, a dedicated network, or a virtual dedicated network. In some embodiments, data exchanged by using a network may be represented by using a technology and/or format such as the Hyper Text Mark-up Language (HTML) and the Extensible Markup Language (XML). In addition, all or some of links may be encrypted by using an encryption technology such as the Secure Socket Layer (SSL), the Transport Layer Security (TLS), the Virtual Private Network (VPN), and the Internet Protocol Security (IPsec). In some other embodiments, the foregoing data communication technology may be replaced or supplemented with a customized and/or dedicated data communication technology.

Figure 2:
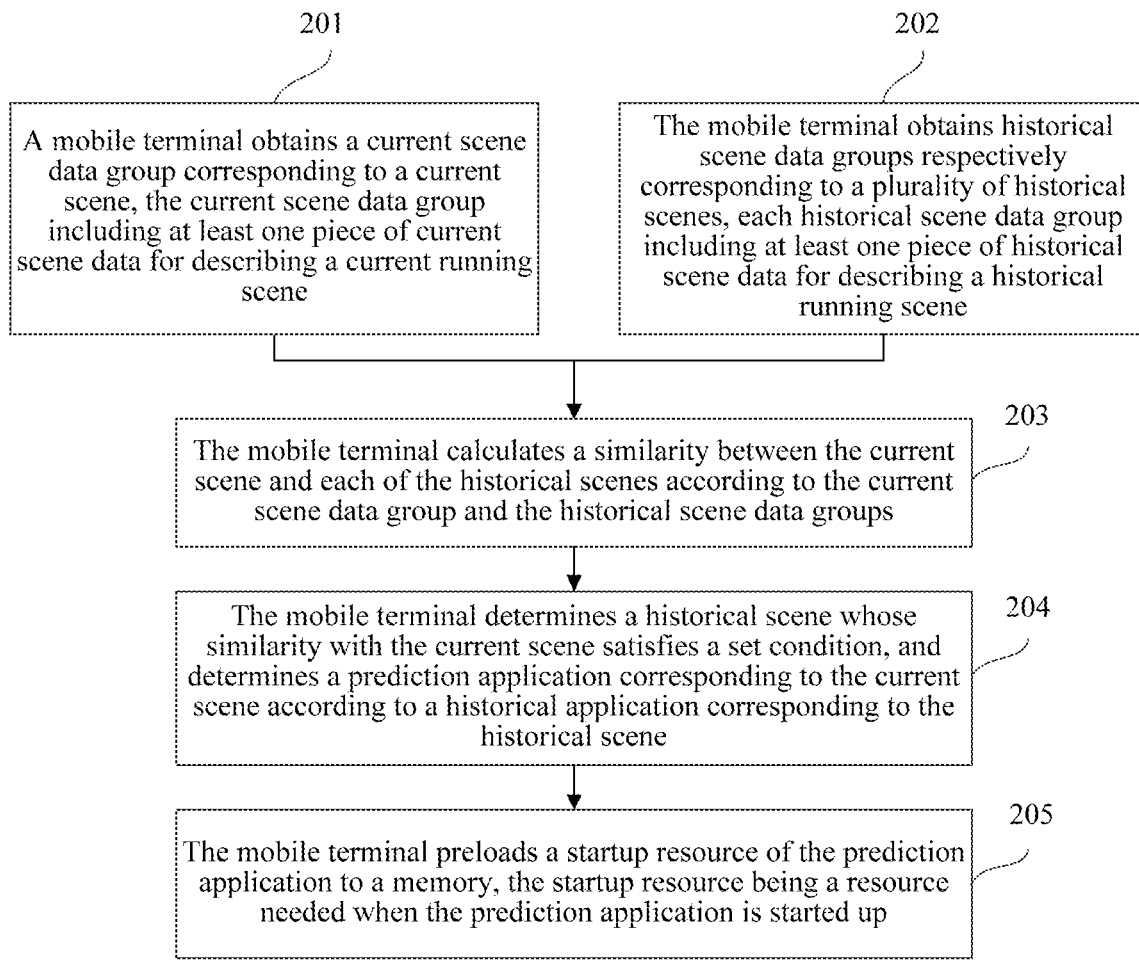
FIG. 2 is a flowchart of a startup resource loading method according to an exemplary embodiment of this application.

FIG. 2 is a flowchart of a startup resource loading method according to an exemplary embodiment disclosed in this application. This embodiment is described by using an example in which the method is used in the mobile terminal 120. The method includes the following steps.

Step 201: A mobile terminal 120 obtains a current scene data group corresponding to a current scene, the current scene data group including at least one piece of current scene data (e.g., attributes) for describing a current running scene.

In this embodiment, the current scene data may be classified according to a scene data type. The scene data type may include: at least one piece of user scene data, environment scene data, and terminal scene data. Therefore, the current scene data may include at least one piece of current user scene data, current environment scene data, and current terminal scene data.

The current user scene data may be used for describing information about a user using the mobile terminal when the mobile terminal currently runs. For example, the current user scene data may include at least one of the name, gender, age, career, mood, and education background of the user. The current environment scene data may be used for describing an environment in which the user using the mobile terminal is located when the mobile terminal currently runs. For example, the current environment scene data may include at least one of a time, a location, a weather condition, humidity, illumination, a sound, and a traffic condition. The current terminal scene data may be used for describing information about the mobile terminal when the mobile terminal currently runs. For example, the current terminal scene data may include at least one of a terminal identifier, network information, and a device type of the mobile terminal.

For example, a schematic current scene data group may be represented in a set form as: {terminal identifier, time, gender, age, location, temperature}.

In an implementation, the current scene data may be represented in a form of a quantization value and/or a text. For example, when the current scene data includes a gender, the current scene data may be "male"; when the current scene data includes a temperature, the current scene data may be "20° C.".

When the current scene data is represented in a form of a quantization value, the current scene data may be represented in any form such as a value, an interval, and coordinates. For example, if the current scene data includes the age of the user, and the age of the user is represented in a form of a value, the age included in the current scene data may be "18". For another example, if the current scene data includes a temperature, and the temperature is represented in a form of an interval, the temperature included in the current scene data may be "18° C.-25° C.". For another example, if the current scene data includes a location, and the location is identified in a form of coordinates, the location included in the current scene data may be "(40° N, 116° E)".

Step 202: The mobile terminal 120 obtains historical scene data groups respectively corresponding to a plurality of historical scenes, each historical scene data group including at least one piece of historical scene data for describing a historical running scene.

The historical scene data may also be classified according to the scene data type. Therefore, the historical scene data may include at least one of historical user scene data, historical environment scene data, and historical terminal scene data. Specifically, refer to the current scene data in step 201 for both a scene data type and a representation form of the historical scene data. Details are not described in this embodiment.

In this embodiment, a database in the mobile terminal may store the historical scene data groups corresponding to the historical scenes. Therefore, the mobile terminal may obtain the historical scene data groups corresponding to the historical scenes in the database or may obtain historical scene data groups corresponding to some of the historical scenes in the database.

It should be noted that when the mobile terminal obtains historical scene data groups corresponding to some of the historical scenes in the database, the mobile terminal may obtain historical scene data groups corresponding to the M latest historical scenes in the database, or the mobile terminal may randomly obtain historical scene data groups corresponding to M historical scenes, where M is a positive integer.

It should be noted that during actual implementation, step 202 and step 201 do not indicate a particular sequence and may usually be simultaneously performed.

Step 203: The mobile terminal 120 calculates a similarity between the current scene and each of the historical scenes according to the current scene data group and the historical scene data groups.

Specifically, the current scene data group and each of the historical scene data groups may be input into a similarity model, and the similarity between the current scene and each of the historical scenes may be calculated according to the similarity model.

The similarity model may be a model obtained through pre-training by the mobile terminal and/or server according to at least one group of historical scene samples. Each group of historical scene samples may include the historical scene data respectively corresponding to two of the historical scenes and a scene similarity score between the two historical scenes, and the scene similarity score may be calibrated according to a similarity between historical applications corresponding to the two historical scenes.

Step 204: The mobile terminal 120 determines a historical scene whose similarity with the current scene satisfies a set condition, and determines a prediction application corresponding to the current scene according to a historical application corresponding to the historical scene.

The historical application is an application run in the historical scene. In an implementation, the database stores the historical applications corresponding to the historical scenes in addition to the historical scene data groups corresponding to the historical scenes. In this way, the mobile terminal may obtain a historical application corresponding to each historical scene from the database.

In an implementation, the mobile terminal may first determine N historical scenes with the largest similarities, and then use historical applications corresponding to the N historical scenes as prediction applications. A value of N may be preset by a system or user-defined. It should be noted that this embodiment does not limit a value determining manner of N.

In other implementations, the mobile terminal may first determine a historical scene whose similarity with the current scene is greater than a similarity threshold, and then use a historical application corresponding to the historical scene as a prediction application. The similarity threshold may be a system preset value or a user-defined value. It should be noted that this embodiment does not limit a setting manner of the similarity threshold.

In an exemplary example, similarities between a historical scene 1 to a historical scene 5 and the current scene are respectively shown in the following Table 1:

TABLE 1

| | Historical scene | | | | |
|---|---|---|---|---|---|
| | Historical scene 1 | Historical scene 2 | Historical scene 3 | Historical scene 4 | Historical scene 5 |
| Similarity with the current scene | 0.8 | 0.2 | 0.6 | 0.75 | 0.45 |

Assuming N=2, the prediction application determined by the mobile terminal includes a historical application corresponding to the historical scene 1 and a historical application corresponding to the historical scene 4. For another example, assuming that the similarity threshold is 0.5, the prediction application determined by the mobile terminal may include the historical application corresponding to the historical scene 1, a historical application corresponding to the historical scene 3, and the historical application corresponding to the historical scene 4.

Step 205: The mobile terminal 120 preloads a startup resource of the prediction application to a memory, the startup resource being a resource needed when the prediction application is started up.

In conclusion, in the startup resource loading method provided in this embodiment of this application, a current scene data group corresponding to a current scene and historical scene data groups respectively corresponding to M historical scenes are obtained, and a similarity between the current scene and each of the historical scenes is obtained according to the current scene data group and the historical scene data groups. Then, a prediction application corresponding to the current scene is determined according to historical applications corresponding to N historical scenes with the largest similarities. At last, a startup resource of the prediction application is preloaded to a memory. Because there is a relatively large probability for a mobile terminal to start up a same application in a similar scene, the mobile terminal may predict a historical application corresponding to a historical scene with a relatively high similarity as a prediction application to be started up by the mobile terminal and preload a startup resource needed when the prediction application is started up to a memory. In this way, when the mobile terminal receives a click operation of a user, the mobile terminal may directly use the preloaded startup resource to start up the prediction application, avoiding that the mobile terminal starts to load the startup resource to start up the prediction application only after receiving the click operation of the user, thereby reducing a time cost by the mobile terminal to start up the application.

Figure 3:
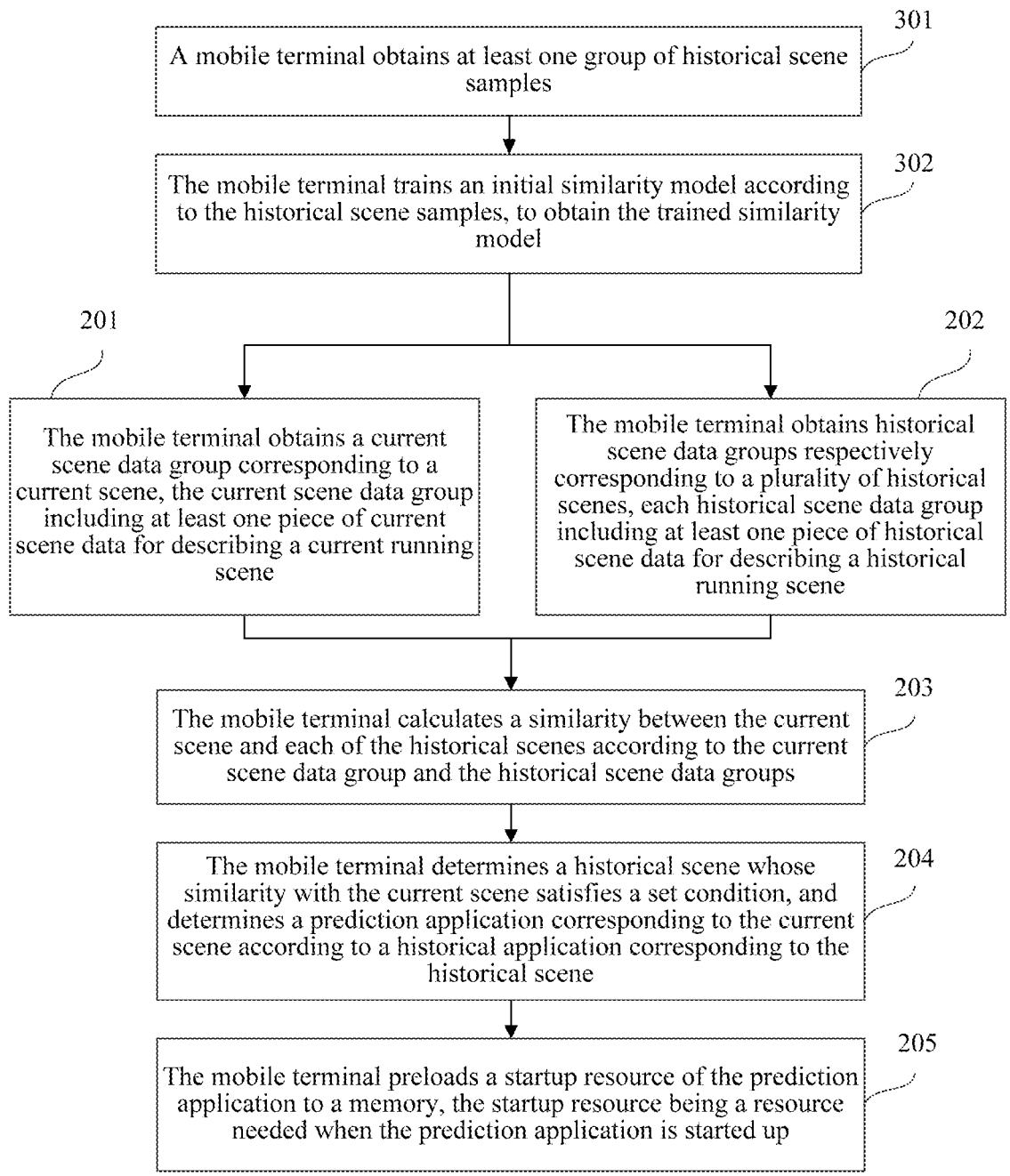
FIG. 3 is a flowchart of a startup resource loading method according to another exemplary embodiment of this application.

Further, as shown in FIG. 3, in an implementation of this embodiment of this application, before the mobile terminal calculates the similarity between the current scene and the historical scene by using the similarity model, the method may further include a model training process, and the process may specifically include the following several steps.

Step 301: A mobile terminal 120 obtains at least one group of historical scene samples.

Each group of the historical scene samples may include the historical scene data respectively corresponding to two of the historical scenes and a scene similarity score between the two historical scenes, and the scene similarity score may be calibrated according to a similarity between historical applications corresponding to the two historical scenes. A relationship between the scene similarity score and the similarity between the historical applications may be preset by the system. For example, the scene similarity score may be in direct proportion to the similarity between the historical applications. Namely, a higher scene similarity score indicates a high similarity between the historical applications. On the contrary, a lower scene similarity score indicates a lower similarity between the historical applications.

In an implementation, the similarity between the two historical applications may be determined by calculating a similarity between labels respectively corresponding to the two applications. For example, after the labels respectively corresponding to the two applications are obtained, a same label in the labels respectively corresponding to the two historical applications may be first determined, then a ratio of the same label to the labels corresponding to the two historical applications is calculated, and then, the similarity between the two historical applications may be determined according to the ratio.

For example, it is assumed that a value range of the similarity score is [0, 1]. When the two historical scenes correspond to a same historical application, the scene similarity score between the two historical scenes is 1. It is assumed that a historical scene a corresponds to a historical application a, labels corresponding to the historical application a include food, group purchase, and a mobile phone, a historical scene b corresponds to a historical application b, and labels corresponding to the historical application b include a mobile phone, clothes, and KTV. Because the labels corresponding to the historical application a and the labels corresponding to the historical application b have only one same label, that is, a mobile phone, a similarity between the historical application a and the historical application b may be ⅓=0.33, and a similarity between the historical scene a and the historical scene b may be equal to the similarity 0.33 between the historical application a and the historical application b.

Step 302: The mobile terminal 120 trains an initial similarity model according to the historical scene samples, to obtain the trained similarity model.

The initial similarity model includes at least one scene data type and an initial weight corresponding to each scene data type. One possible implementation is that an initial weight corresponding to each scene data type in the initial similarity model is equal. For example, when the initial similarity model has four scene data types, initial weights corresponding to the scene data types are all 0.25.

It should be noted that the initial similarity model may be any model of an artificial neural network, Adaboost, a support vector machine (SVM), a genetic algorithm, and a naive Bayes model. The artificial neural network may be a region-based convolutional neural network (R-CNN), a Fast R-CNN learning algorithm, or a Faster R-CNN learning algorithm.

When the implementation environment in this embodiment is shown in FIG. 1, to reduce a data handling capacity when the mobile terminal trains the similarity model, the mobile terminal may send the historical scene samples to a server having a model training function, and the server obtains the similarity model through training according to the historical scene samples.

It should be noted that the model training process described in step 301 and step 302 is usually performed before step 201, but during actual implementation, may alternatively be simultaneously performed with step 201 and step 202. This is not limited in this embodiment.

Figure 4:
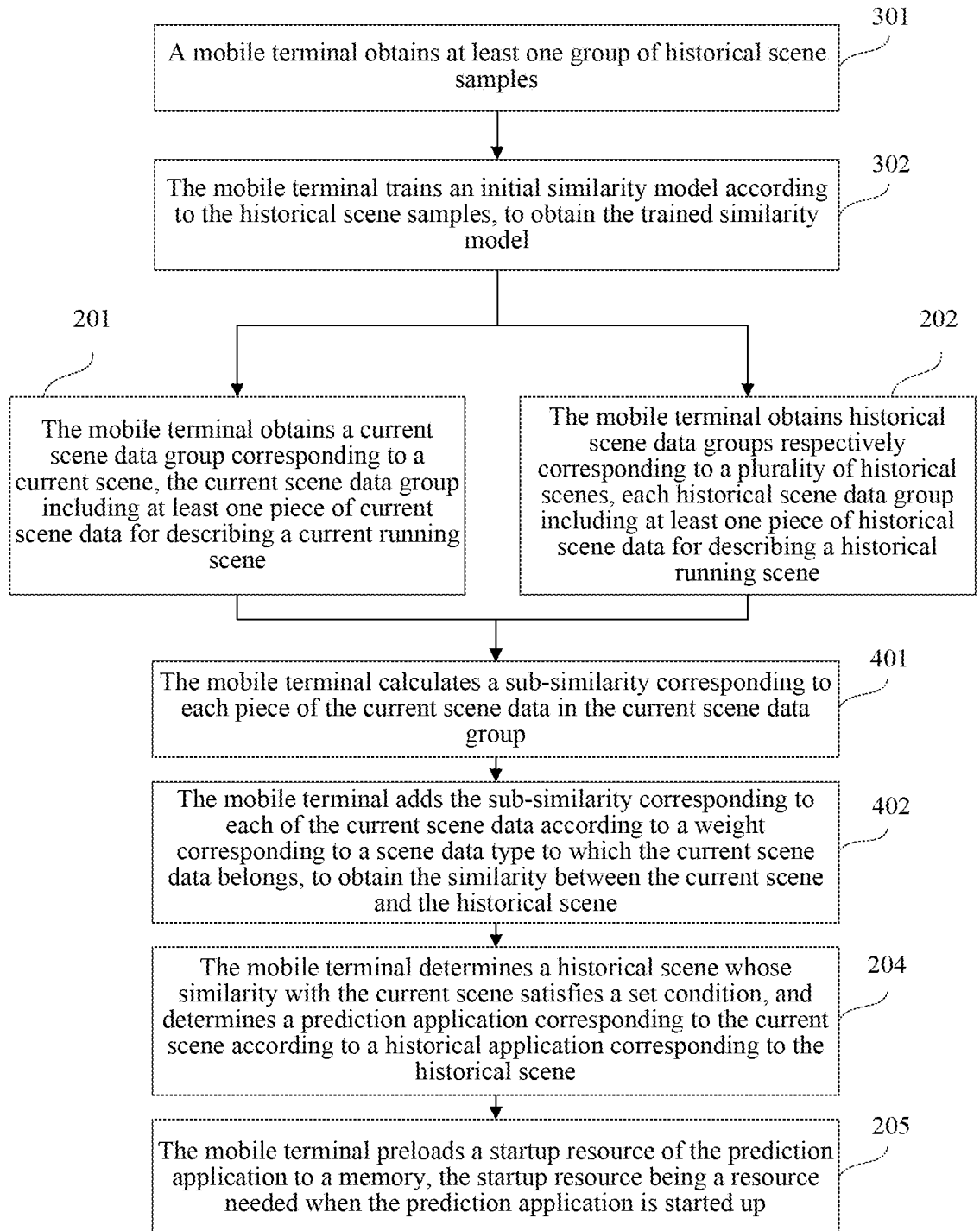
FIG. 4 is a flowchart of a startup resource loading method according to another exemplary embodiment of this application.

During actual implementation, a running scene in which the mobile terminal is locates usually includes a large amount of scene data. Therefore, the current scene data group obtained by the mobile terminal may include at least two pieces of current scene data. Correspondingly, the historical scene data group obtained by the mobile terminal may also include at least two pieces of historical scene data. Therefore, in an implementation of this embodiment of this application, as shown in FIG. 4, step 203 may include the following steps.

Step 401: The mobile terminal 120 calculates a sub-similarity corresponding to each piece of the current scene data in the current scene data group.

The sub-similarity corresponding to the current scene data may be a similarity between the current scene data and the historical scene data belonging to a same scene data type in the historical scene data group. Refer to related introduction of step 201 for a meaning of the scene data type. Details are not described in this embodiment. For example, if current scene data is a location, historical scene data belonging to a same scene data type as the current scene data is also a location, and a sub-similarity corresponding to the current scene data is a similarity between the current scene data "location" and the historical scene data "location".

When the current scene data is represented in different forms, the mobile terminal 120 calculates the sub-similarity corresponding to the current scene data by using different methods, as shown in the following:

In a first possible implementation, when the current scene data is represented by using a value, the mobile terminal 120 may calculate the sub-similarity according to the following formula:

$$Sim(S_i, S_j) = 1 - \frac{|S_i - S_j|}{S_j}$$

where Sim $(S_i, S_j)$ is a sub-similarity corresponding to the current scene data, $S_i$ is the ith piece of current scene data in the current scene data group, and $S_j$ is the historical scene data belonging to a same scene data type as $S_i$ in the historical scene data group; $1 \leq i \leq n$, and n is the number of pieces of current scene data in the current scene data group.

For example, current scene data "temperature" is 20° C., and historical scene data "temperature" is 25° C., the mobile terminal 120 obtains a sub-similarity 1−|20° C.-25° C.|/25° C.=0.8 corresponding to the current scene data "temperature" through calculation.

In a second possible implementation, when the current scene data is represented by using an interval, the mobile terminal 120 may calculate the sub-similarity according to the following formula:

$$Sim(S_i, S_j) = 1 - \frac{|r_i^s - r_j^s|}{2r_j^s} - \frac{|r_i^e - r_j^e|}{2r_j^e}$$

where Sim $(S_i, S_j)$ is a sub-similarity corresponding to the current scene data, $S_i$ is the ith piece of current scene data in the current scene data group, $S_j$ is the historical scene data belonging to a same scene data type as $S_i$ in the historical scene data group, $S_i \in [r_i^s, r_i^e]$, $S_j \in [r_j^s, r_j^e]$, $r_i^s$ is a minimum value of the current scene data represented by $S_i$, $r_i^e$ is a maximum value of the current scene data represented by $S_i$, $r_j^s$ is a minimum value of the historical scene data represented by $S_j$, and $r_j^e$ is a maximum value of the historical scene data represented by $S_j$.

For example, the current scene data "temperature" is 18° C.-25° C., $r_i^s$=18° C., $r_i^e$=25° C.; if the historical scene data "temperature" is 20° C.-30° C., $r_j^s$=20° C., $r_j^e$=30° C.; the mobile terminal 120 obtains a sub-similarity 1−|18° C.-20° C.|/2*20° C.-|25° C.-30° C.|/2*30° C.≈0.867 corresponding to the current scene data "temperature" through calculation.

In a third possible implementation, when the current scene data is represented by using coordinates, the mobile terminal 120 may calculate the sub-similarity according to the following formula:

$$Sim(S_i, S_j) = 1 - \sqrt{(x_i - x_j)^2 + (y_i - y_j)^2}$$

where Sim $(S_i, S_j)$ is a sub-similarity corresponding to the current scene data, $S_i$ is the ith piece of current scene data in the current scene data group, $S_j$ is the historical scene data belonging to a same scene data type as $S_i$ in the historical scene data group, and $S_i=(x_i, y_i)$, $S_j=(x_j, y_j)$.

It should be noted that when the current scene data is represented in a text form, the current scene data may also be quantized to be represented in a form of a quantization value, and then the sub-similarity corresponding to the current scene data is calculated. For example, when the current scene data is a gender, "male" may be quantized into 1, and "female" is quantized into 0. This is not limited in this embodiment. However, this embodiment of this application is explained by using the current scene data represented in a form of a quantization value as an example.

Step 402: The mobile terminal 120 adds the sub-similarity corresponding to each of the current scene data according to a weight corresponding to a scene data type to which the current scene data belongs, to obtain the similarity between the current scene and the historical scene.

In an implementation, the mobile terminal 120 may calculate the similarity according to the following formula:

$$\text{Sim}(C1, C2) = \Sigma_{i=1}^{n} \text{Sim}(S_i, S_j) * p_i$$

where C1 is the current scene data group, C2 is the historical scene data group, Sim (C1, C2) is the similarity between the current scene and the historical scene, n is the number of pieces of current scene data in the current scene data group, $n \geq 2$ and n is a positive integer, $S_i$ is the ith piece of current scene data in the current scene data group, $S_j$ is the historical scene data belonging to a same scene data type as $S_i$ in the historical scene data group, $p_i$ is a weight corresponding to a scene data type to which $S_i$ belongs, a value of $p_i$ is obtained through training in a process of obtaining the similarity model through training, $\Sigma p_i = 1$, and the current scene data is asynchronous; Sim ($S_i$, $S_j$) is a sub-similarity corresponding to the current scene data, and Sim ($S_i$, $S_j$) may be obtained through calculation by using any possible implementation in the foregoing three possible implementations.

For example, C1 and C2 respectively include a sound, a temperature, and a location, C1={sound 1, temperature 1, location 1}, and C2={sound 2, temperature 2, location 2}, where the sounds in C1 and C2 are both represented in a numerical value form, the temperatures are represented in an interval form, and the locations are represented in a coordinate form. Therefore, the mobile terminal 120 may calculate a sub-similarity Sim (sound) corresponding to the sound 1 in C1 by using the foregoing first possible implementation in step 401, assuming that Sim (sound)=0.7. The mobile terminal 120 may calculate a sub-similarity Sim (temperature) corresponding to the temperature 1 in C1 by using the foregoing second possible implementation, assuming that Sim (temperature)=0.9. The mobile terminal 120 may calculate a sub-similarity Sim (location) corresponding to the location 1 in C1 by using the foregoing third possible implementation, assuming that Sim (location)=0.4. Refer to the examples in step 401 for a specific calculation manner. This is not described in detail in this embodiment.

It is assumed that the similarity model obtained through training is Sim (C1, C2)=0.2*Sim (sound)+0.2*Sim (temperature)+0.6*Sim (location)=0.2*0.7+0.2*0.9+0.6*0.4=0.56.

It should be noted that the foregoing exemplary examples use an example in which each piece of current scene data in the current scene data group has historical scene data belonging to a same scene data type as the current scene data. During actual implementation, for a piece of current scene data, there may be no historical scene data belonging to the same scene data type as the current scene data in the historical scene data group. For example, in the foregoing exemplary example, C2={sound 2, temperature 2}, C2 does not include a location, and thus, the mobile terminal 120 may not calculate a sub-similarity corresponding to the current scene data, that is, a location. In this embodiment of this application, an example in which historical scene data corresponding to historical scenes includes same data types is used for description, but this embodiment is not limited thereto.

Figure 5:
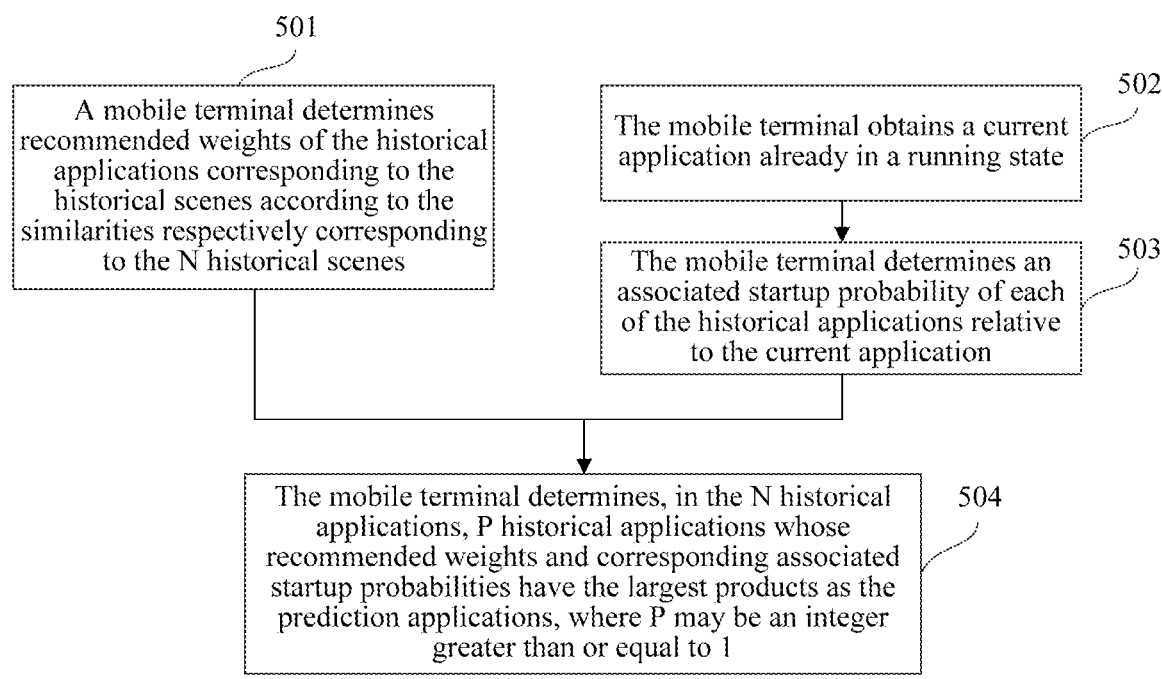
FIG. 5 is a flowchart of a startup resource loading method according to another exemplary embodiment of this application.

During actual implementation, when starting a prediction application in a current scene, the mobile terminal 120 may turn to start another application due to interruption of an emergency. For example, when the mobile terminal 120 is about to start a play application, an instant messaging client run at a background receives an instant messaging message, and thus, a user may open a picture application in a process of responding to the instant messaging message. Therefore, in other optional embodiments based on the foregoing embodiments, the mobile terminal 120 may not directly determine historical applications corresponding to N historical scenes whose similarities are largest as the prediction application. Therefore, as shown in FIG. 5, step 204 may include the following several steps:

Step 501: A mobile terminal 120 determines recommended weights of the historical applications corresponding to the historical scenes according to the similarities respectively corresponding to the N historical scenes.

A value range of the recommended weights may be [0, 1]. The recommended weights may be in direct proportion to the similarities between the historical scenes and the current scene. It may be understood that a larger similarity between the historical scenes and the current scene indicates a larger recommended weight of the historical application corresponding to the historical scene, and a correspondence between the similarities and the recommended weights may be preset by the system or defined by a user.

To reduce a data handling capacity of the mobile terminal 120, the mobile terminal 120 determines recommended weights corresponding to historical applications corresponding to N historical scenes whose similarities with the current scene are largest. During actual implementation, the mobile terminal 120 may also determine a recommended weight of a historical application corresponding to each historical scene.

Step 502: The mobile terminal 120 obtains a current application already in a running state.

The current application in a running state may include an application run at a foreground of the mobile terminal and an application run at a background of the mobile terminal.

It should be noted that during actual implementation, step 502 and step 501 do not indicate a particular sequence, and the two steps are usually simultaneously performed.

Step 503: The mobile terminal 120 determines an associated startup probability of each of the historical applications relative to the current application.

The mobile terminal 120 may perform associated startup on another application in a process of running an application. For example, the application usually triggers to start a payment application in a process of running a shopping application, and thus there is a great probability to perform associated startup on the shopping application and the payment application.

Therefore, the mobile terminal may collect data about mutual associated startup between applications as an associated startup sample and train the associated sample according to a predetermined training algorithm to obtain an associated startup model. In this way, an associated startup probability of each historical application may be determined according to the associated startup model.

The associated startup probability may be used for representing a probability for performing associated startup on the historical application in a process of running a current application. A value range of the associated startup probability may be [0, 1]. It may be understood that a larger probability for performing associated startup on the historical application by the current application indicates a greater associated startup probability of the historical application relative to the current application.

Likewise, after determining the historical applications corresponding to the N historical scenes whose similarities with the current scene are largest, the mobile terminal 120 may determine associated startup probabilities of the historical applications relative to the current application or determine associated startup probabilities of applications included in the mobile terminal relative to the current application. Refer to related introduction of step 302 for a meaning of the predetermined training algorithm. This is not described in detail in this embodiment.

Step 504: The mobile terminal 120 determines, in the N historical applications, P historical applications whose recommended weights and corresponding associated startup probabilities have the largest products as the prediction applications, where P may be an integer greater than or equal to 1.

It should be noted that when P=1, the mobile terminal may determine the prediction application by calculating $$Q = \underset{N}{\mathrm{argmax}}(\omega_i * \lambda_i).$$

Q is a historical application in the N historical applications that makes $\omega_i * \lambda_i$ a maximum value, $\omega_i$ is a recommended weight, and $\lambda_i$ is an associated startup probability.

For example, the mobile terminal determines that historical applications corresponding to three historical scenes whose similarities with the current scene are largest are respectively a historical application a, a historical application b, and a historical application c. A recommended weight corresponding to the historical application a is 0.5, a recommended weight corresponding to the historical application b is 0.3, and a recommended weight corresponding to the historical application c is 0.2. The mobile terminal 120 may obtain through calculation according to the associated startup model that an associated startup probability of the historical application a is 0.1, an associated startup probability of the historical application b is 0.3, and an associated startup probability corresponding to the historical application c is 0.8. Therefore, the mobile terminal 120 may obtain through calculation that a product of the recommended weight and the associated startup probability that correspond to the historical application a is 0.05, a product of the recommended weight and the associated startup probability that correspond to the historical application b is 0.09, and a product of the recommended weight and the associated startup probability that correspond to the historical application c is 0.16. Assuming that P=1, the mobile terminal finally determines that the historical application c is the prediction application.

In conclusion, in the startup resource loading method provided in this embodiment of this application, because the mobile terminal does not directly determine the historical applications corresponding to several historical scenes whose similarities with the current scene are largest as the prediction application but comprehensively analyzes whether the current application already in a running state performs associated startup on other applications and then determine the applications on which associated startup may be performed as the prediction application, thereby improving accuracy of determining the obtained prediction application and avoiding resource waste caused when a resource of an incorrect prediction application is loaded.

Figure 6:
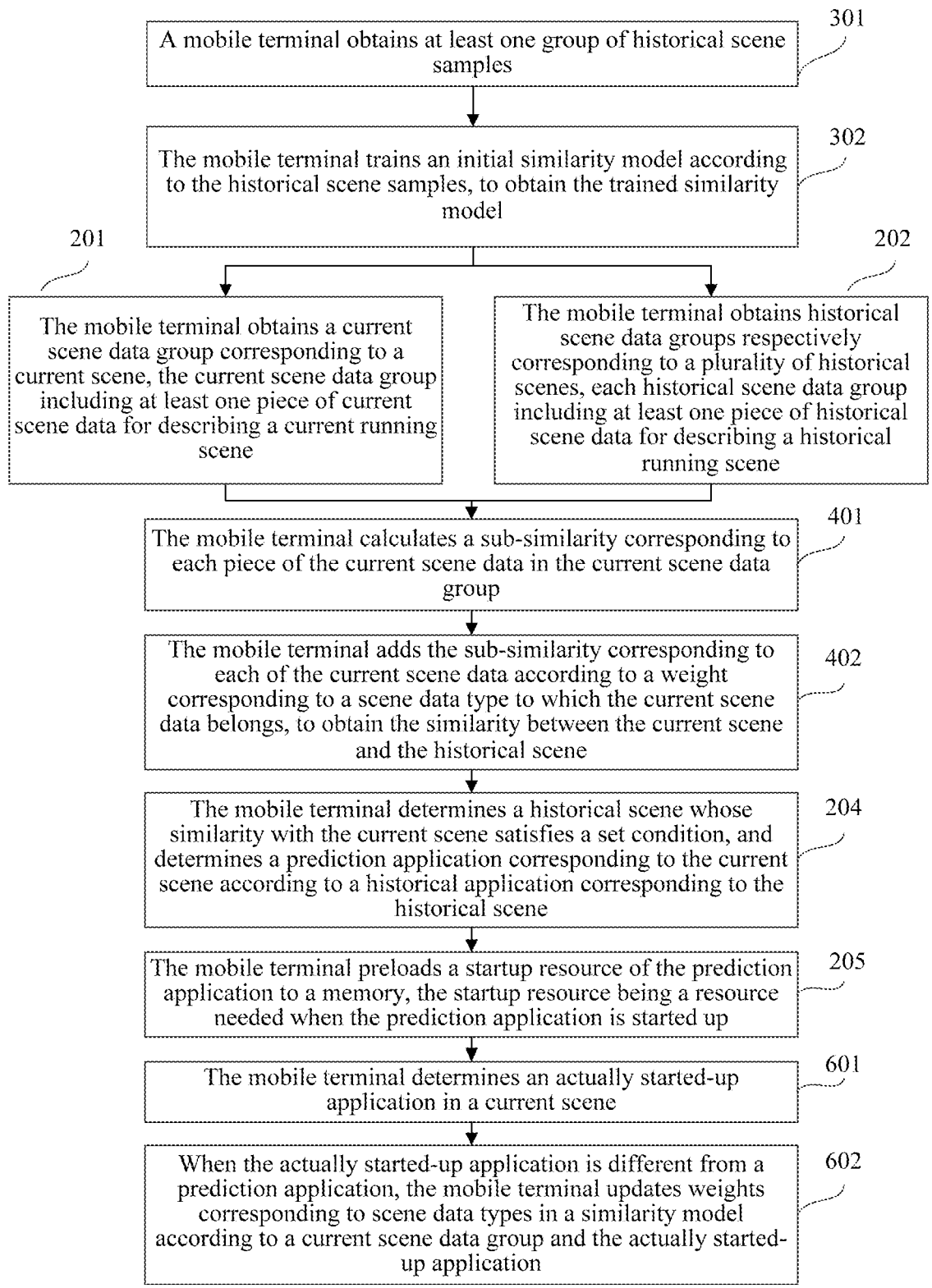
FIG. 6 is a flowchart of a startup resource loading method according to another exemplary embodiment of this application.

In an implementation, in other optional embodiments based on the foregoing embodiments, the method may further include the following several steps, as shown in FIG. 6:

Step 601: A mobile terminal 120 determines an actually started-up application in a current scene.

Step 602: When the actually started-up application is different from a prediction application, the mobile terminal 120 updates weights corresponding to scene data types in a similarity model according to a current scene data group and the actually started-up application.

In conclusion, in the startup resource loading method provided in this embodiment of this application, the mobile terminal may continuously update the weights in the similarity model according to an actual running result when predicting that the prediction application has an error, to improve accuracy of determining the obtained similarity model and accuracy of determining the obtained prediction application, as to avoid resource waste caused when a resource of an incorrect prediction application is loaded.

Figure 7:
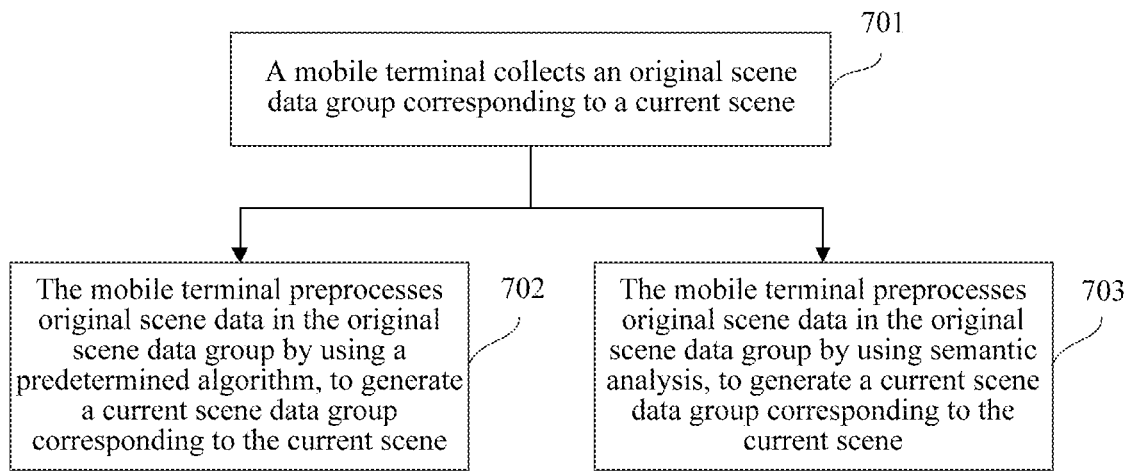
FIG. 7 is a flowchart of a startup resource loading method according to another exemplary embodiment of this application.

In the foregoing embodiments, the current scene data in the current scene data group obtained by the mobile terminal is usually scene data on which data preprocessing is performed. Therefore, when being performed, the step 201 may include the following several steps, as shown in FIG. 7:

Step 701: A mobile terminal 120 collects an original scene data group corresponding to a current scene.

The original scene data group may include at least one piece of original scene data, and the original scene data may be used for describing a current running scene. It may be understood that the mobile terminal 120 may determine terminal information such as a terminal identifier, network information, a device type, and a running thread of the mobile terminal 120 in the current running scene and use the terminal information as the original scene data and/or record running state such as a browsing history and a downloading history of a user using the mobile terminal 120 in the current running scene, personal information filled by the user, and a grade feedback filled by the user and uses the running data as the original scene data.

In an implementation, the mobile terminal 120 may collect environment information in the current running scene by using a sensor assembly and use the environment information as the original scene data. The sensor assembly may include one or more of the following: a gravity sensor, an acceleration sensor, a magnetic field sensor, a gyroscope, a light sensor, a distance sensor, a global positioning system (GPS), a fingerprint sensor, a temperature sensor, and the like. For example, the mobile terminal may collect a location by using the GPS, may collect a temperature by using the temperature sensor, and the like.

In an implementation, the mobile terminal 120 may obtain the original scene data from a server, for example, obtain a temperature from the server.

Step 702: The mobile terminal 120 preprocesses original scene data in the original scene data group by using a predetermined algorithm, to generate a current scene data group corresponding to the current scene.

The predetermined algorithm may be used for performing at least one of data cleaning, data integration, data reduction, and data transformation on the original scene data.

The predetermined algorithm may be used for performing data cleaning, such as noise data smoothing, missing data filling, incorrect data deletion, and the like, on the original scene data. In an implementation, the predetermined algorithm may include a Bayesian network algorithm.

The predetermined algorithm may be used for performing data integration on the original scene data collected by the mobile terminal. The mobile terminal 120 may collect multiple pieces of original scene data belonging to a same scene data type by using different methods. The multiple pieces of original scene data may be the same or different. For example, the mobile terminal may collect a temperature by using a temperature sensor or obtain a temperature from the server. A difference between the temperature collected by the mobile terminal by using the temperature sensor and the temperature obtained by the mobile terminal from the server may be within an error range. However, this may cause data redundancy of the original scene data. In addition, the difference between the temperature collected by the mobile terminal by using the temperature sensor and the temperature obtained by the mobile terminal from the server may go beyond the error range. In this way, data of the original scene data may be inconsistent. To resolve a problem that data redundancy and data are inconsistent, in an implementation, the predetermined algorithm includes other correlation analysis such as Chi-square analysis, correlation coefficient analysis, and covariance analysis.

The predetermined algorithm may be used for performing data reduction on the original scene data, to reduce the number of pieces of the original scene data. In an implementation, the predetermined algorithm includes principal component analysis, wavelet transform, a sampling algorithm, and the like.

The predetermined algorithm may be used for performing data transformation on the original scene data, so as to convert the original scene data into data in a uniform form. For example, different orders of magnitude of the original scene data may be converted into a same order of magnitude of scene data. For example, the original scene data may be all converted into scene data within [0, 1]. For another example, original scene data of different units may be converted into scene data of a same unit. For example, a temperature represented by a Fahrenheit temperature value is converted into a temperature represented by a Celsius temperature value.

Step 703: The mobile terminal 120 preprocesses original scene data in the original scene data group by using semantic analysis, to generate a current scene data group corresponding to the current scene.

In this embodiment, the mobile terminal 120 may generate the current scene data group after preprocessing the original scene data in the original scene data group by using semantic analysis. The generated current scene data group may include: the processed original scene data and/or scene data generated through logical reasoning, for example, the mood of the user that is generated through reasoning according to a type of music played by the user.

During actual implementation, the mobile terminal 120 may perform at least one of step 702 and step 703. When the mobile terminal 120 performs both step 702 and step 703, step 702 and step 703 do not indicate a particular sequence and are usually simultaneously performed.

In addition, in the foregoing embodiments, the historical scene data group and the historical application that correspond to the historical scene and that are stored in a database of the mobile terminal 120 may be obtained and stored in the database by the mobile terminal 120 in a historical running scene. Refer to the embodiment shown in FIG. 7 for a method for obtaining the historical scene data group corresponding to the historical scene by the mobile terminal 120. This is not described in detail in this embodiment.

During actual implementation, the mobile terminal 120 may obtain historical scene data groups of a large quantity of historical scenes. To reduce an amount of computation when the mobile terminal 120 calculates the similarity between the current scene and the historical scene, in an implementation, the mobile terminal 120 may first cluster the historical scene data groups of the historical scenes, then store a historical scene data group corresponding to each historical scene category in a database, then obtain through training the similarity model by using the historical scene data group corresponding to each historical scene category, and calculate a similarity between the current scene and each historical scene according to the similarity model.

Specifically, the mobile terminal 120 may calculate a similarity between the historical scenes and determine a historical scene whose similarity is greater than a predetermined threshold. The historical scene and the current scene belong to a same historical scene category. The predetermined threshold may be a system preset value or a user-defined value. Refer to the method for calculating the similarities between the current scene and the historical scenes shown in the foregoing embodiments for the method for calculating the similarities between the historical scenes by the mobile terminal 120. This is not described in detail in this embodiment.

For example, the mobile terminal obtains historical scene data groups corresponding to 100 historical scenes. If the historical scene data groups are not clustered, the mobile terminal needs to separately calculate similarities between the current scene and the 100 historical scenes. If the mobile terminal clusters the 100 historical scenes, 10 historical scene categories may be obtained through clustering. In this way, the mobile terminal only needs to separately calculate similarities between the current scene and the 10 historical scene categories, thereby reducing a computation handling capacity of the mobile terminal.

Figure 8:
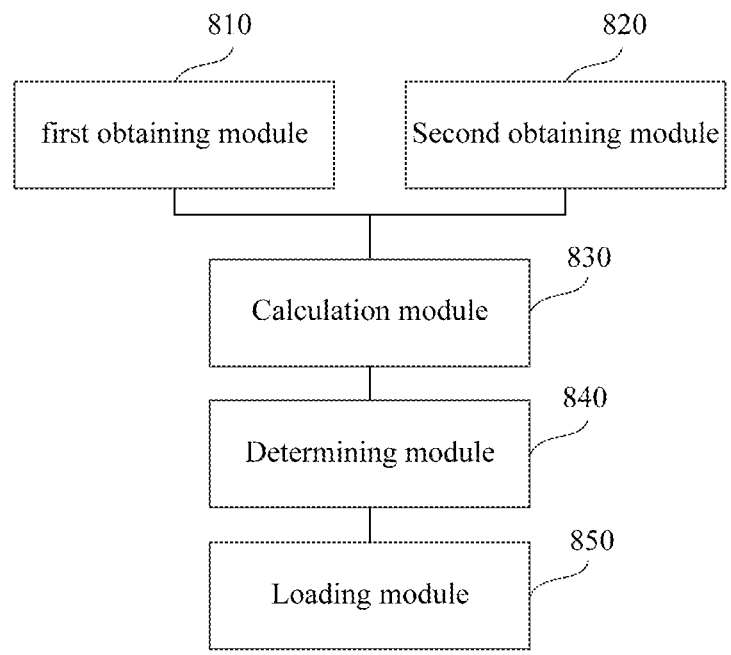
FIG. 8 is a block diagram of a startup resource loading apparatus according to an exemplary embodiment of this application.

Referring to FIG. 8, FIG. 8 is a schematic structural diagram of a startup resource loading apparatus according to an embodiment of this application. The apparatus can become the mobile terminal in the foregoing method embodiments by using software, hardware, or a combination thereof. The apparatus includes:

a first obtaining module 810, configured to perform step 201;

a second obtaining module 820, configured to perform step 202;

a calculation module 830, configured to perform step 203;

a determining module 840, configured to perform step 204; and a loading module 850, configured to perform step 205.

In an implementation, the calculation module 830 further includes the following several units:

a calculation unit, configured to perform step 401; and a weighting unit, configured to perform step 402.

In an implementation, the determining module 840 further includes the following several units:

a first determining unit, configured to perform step 501;

an obtaining unit, configured to perform step 502;

a second determining unit, configured to perform step 503; and a third determining unit, configured to perform step 504.

In an implementation, the first obtaining module 810 is further configured to perform step 701 to step 703.

In an implementation, the apparatus further includes:

a third obtaining module, configured to perform step 301; and a model training module, configured to perform step 302.

In an implementation, the apparatus further includes:

an application determining module, configured to perform step 601; and an update module, configured to perform step 602.

In conclusion, in the startup resource loading apparatus provided in this embodiment of this application, the mobile terminal calculates the similarities between the current scene and the historical scenes according to the similarity model. Because there is a relatively large probability for the mobile terminal to start up a same application in a similar scene, the mobile terminal may predict a historical application corresponding to a historical scene with a relatively high similarity as a prediction application to be started up by the mobile terminal and preload a startup resource needed when the prediction application is started up to a memory. In this way, when the mobile terminal receives a click operation of a user, the mobile terminal may directly use the preloaded startup resource to start up the prediction application, avoiding that the mobile terminal starts to load the startup resource to start up the prediction application only after receiving the click operation of the user, thereby reducing a time cost by the mobile terminal to start up the application.

Figure 9:
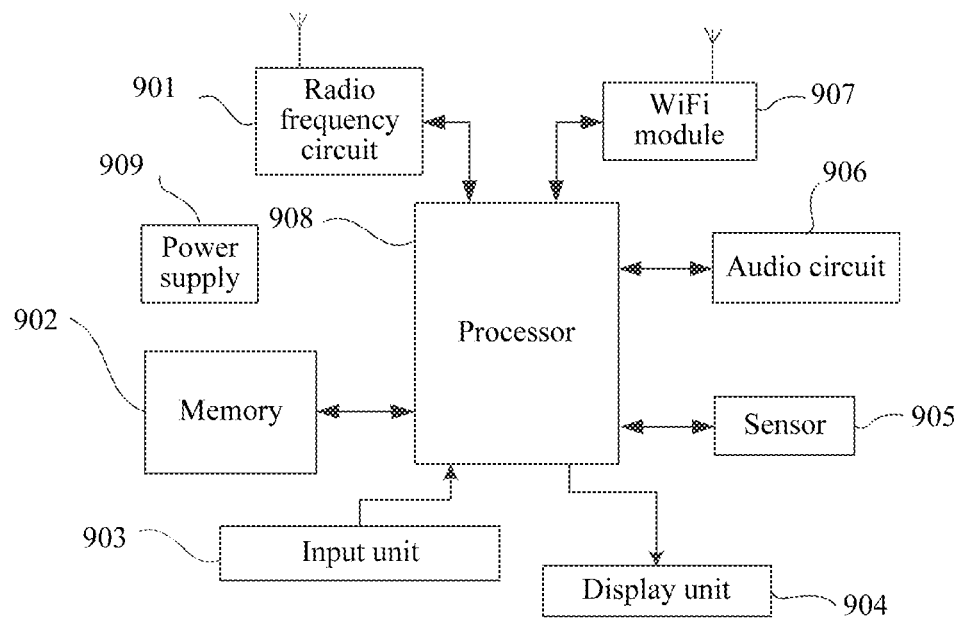
FIG. 9 is a schematic structural diagram of a mobile terminal according to according to an exemplary embodiment of this application.

FIG. 9 is a block diagram of a mobile terminal 900 according to an embodiment of this application. The mobile terminal may include components such as a radio frequency (RF) circuit 901, a memory 902 including one or more computer readable storage media, an input unit 903, a display unit 904, a sensor 905, an audio circuit 906, a wireless fidelity (WiFi) module 907, a processor 908 including one or more processing cores, and a power supply 909. A person skilled in the art may understand that the structure of the terminal shown in FIG. 9 does not constitute a limitation to the terminal, and the terminal may include more components or fewer components than those shown in the figure, or some components may be combined, or a different component deployment may be used.

The RF circuit 901 may be configured to receive and send signals during information receiving and sending or during a call. Particularly, the RF circuit 110 receives downlink information from a base station, then delivers the downlink information to one or more processors 908 for processing, and sends related uplink data to the base station. Generally, the RF circuit 901 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 901 may also communicate with a network and another device by wireless communication. The wireless communication may use any communications standard or protocol, which includes but is not limited to, Global System for Mobile Communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 902 may be configured to store a software program and module. The processor 908 runs the software program and module stored in the memory 902, to implement various functional applications and data processing. The memory 902 may mainly include a program storage area and a data storage area. The program storage area may store an operating system, an application required by at least one function (such as a sound playback function and an image display function), and the like. The data storage area may store data (such as audio data and an address book) created according to use of the terminal, and the like. In addition, the memory 902 may include a high speed random access memory, and may further include a non-volatile memory, such as at least one magnetic disk storage device, a flash memory, or other volatile solid-state storage devices. Correspondingly, the memory 902 may further include a memory controller, to provide access of the processor 908 and the input unit 903 to the memory 902.

The input unit 903 may be configured to receive input digit or character information, and generate a keyboard, mouse, joystick, optical or track ball signal input related to the user setting and function control. Specifically, in a specific embodiment, the input unit 903 may include a touch-sensitive surface and another input device. The touch-sensitive surface, which may also be referred to as a touch-screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. In an implementation, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 908. Moreover, the touch controller can receive and execute a command sent by the processor 908. In addition, the touch-sensitive surface may be implemented in multiple types, such as a resistive type, a capacitive type, an infrared type, and a surface acoustic wave type. In addition to the touch-sensitive surface, the input unit 903 may further include another input device. Specifically, the another input device may include but is not limited to one or more of a physical keyboard, a function key (for example, a volume control key or a power on/off key), a trackball, a mouse, or a joystick.

The display unit 904 may be configured to display information input by the user or information provided for the user, and various graphical user interfaces of the terminal. The graphical user interfaces may be composed of graphics, text, icons, videos, and any combination thereof. The display unit 904 may include a display panel. In an implementation, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 908 to determine a type of a touch event, and then the processor 908 provides a corresponding visual output on the display panel according to the type of the touch event. Although in FIG. 9, the touch-sensitive surface and the display panel are used as two separate parts to implement input and output functions, in some embodiments, the touch-sensitive surface and the display panel may be integrated to implement the input and output functions.

The mobile terminal may further include at least one sensor 905 such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured by the terminal is not described herein again.

The audio circuit 906, a speaker, and a microphone may provide audio interfaces between the user and the terminal. The audio circuit 906 may convert received audio data into an electric signal and transmit the electric signal to the speaker. The speaker converts the electric signal into a sound signal for output. On the other hand, the microphone converts a collected sound signal into an electric signal. The audio circuit 906 receives the electric signal and converts the electric signal into audio data, and outputs the audio data to the processor 908 for processing. Then, the processor 908 sends the audio data to, for example, another terminal by using the RF circuit 901, or outputs the audio data to the memory 902 for further processing. The audio circuit 906 may further include an earplug jack, to provide communication between a peripheral earphone and the terminal.

WiFi is a short distance wireless transmission technology. The terminal may help, by using the WiFi module 907, the user to receive and send emails, browse a web page, access streaming media, and so on, which provides wireless broadband Internet access for the user. Although FIG. 9 shows the WiFi circuit 907, it may be understood that the WiFi unit 907 is not a necessary component of the terminal, and when required, the WiFi unit 907 may be omitted as long as the scope of the essence of the present disclosure is not changed.

The processor 908 is a control center of the terminal, is connected to various parts of the entire mobile phone by using various interfaces and lines, and by running or executing a software program and/or module stored in the memory 902 and calling data stored in the memory 902, performs various functions of the terminal and processes data, so as to perform overall monitoring on the mobile phone. In an implementation, the processor 908 may include one or more processing cores. In an implementation, the processor 908 may integrate an application processor and a modem processor. The application processor mainly processes an operating system, a user interface, an application, and the like, and the modem processor mainly processes wireless communication. It may be understood that the foregoing modem processor may alternatively not be integrated into the processor 908.

The terminal further includes the power supply 909 (such as a battery) for supplying power to the components. In an implementation, the power supply may be logically connected to the processor 908 by using a power management system, thereby implementing functions, such as charging, discharging, and power consumption management, by using the power management system. The power supply 909 may further include one or more of a direct current or alternating current power supply, a re-charging system, a power failure detection circuit, a power supply converter or inverter, a power supply state indicator, and any other component.

Although not shown, the terminal may further include a camera, a Bluetooth module, and the like, which are not described herein. Specifically, in this embodiment, the processor 908 in the terminal runs one or more program instructions stored in the memory 902, to perform the startup resource loading method provided in the foregoing method embodiments.

Figure 10:
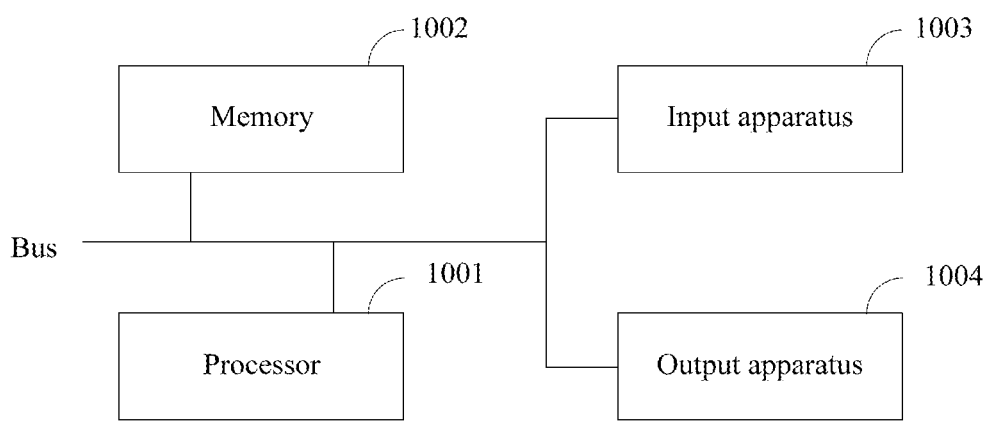
FIG. 10 is a schematic structural diagram of a startup resource loading device according to an exemplary embodiment of this application.

An embodiment of this application further provides a startup resource loading device. Referring to FIG. 10, the device may include: a processor 1001, a memory 1002, an input apparatus 1003, and an output apparatus 1004. There may be one or more processors 1001 in a browser and a server. An example of one processor is used in FIG. 8. In some embodiments of the present disclosure, the processor 1001, the memory 1002, the input apparatus 1003, and the output apparatus 1004 may be connected by using a bus or in another manner. The input apparatus 1003 and the output apparatus 1004 may be interfaces of a communication module, such as interfaces of a GSM module. An example of performing connections by using a bus is used in FIG. 8.

The memory 1002 may be configured to store a software program and module. The processor 1001 runs the software program and module stored in the memory 1002, to implement various functional applications and data processing of the browser and the server. The memory 1002 may mainly include a program storage area and a data storage area. The program storage area may store an operating system, an application required by at least one function, and the like. In addition, the memory 1002 may include a high speed random access memory, and may further include a nonvolatile memory, such as at least one magnetic disk storage device, a flash memory, or other volatile solid-state storage devices. The input apparatus 1003 may be configured to receive input digit or character information, and generate a keyboard signal input related to the user setting and function control of the browser and the server.

Specifically, in this embodiment, the processor 1001 may load, according to the following instructions, executable files corresponding to processes of one or more applications into the memory 1002. The processor 1001 runs the applications stored in the memory 1002, to implement various functions:

obtaining a current scene data group corresponding to a current scene, the current scene data group including at least one piece of current scene data for describing a current running scene;

obtaining historical scene data groups respectively corresponding to a plurality of historical scenes, each historical scene data group including at least one piece of historical scene data for describing a historical running scene;

calculating a similarity between the current scene and each of the historical scenes according to the current scene data group and the historical scene data groups;

determining a historical scene whose similarity with the current scene satisfies a set condition, and determining a prediction application corresponding to the current scene according to a historical application corresponding to the historical scene, the historical application being an application run in the historical scene; and preloading a startup resource of the prediction application to a memory, the startup resource being a resource needed when the prediction application is started up.

In a possible implementation, the calculating a similarity between the current scene and each of the historical scenes according to the current scene data group and the historical scene data groups includes:

inputting the current scene data group and each of the historical scene data groups into a similarity model, and calculating the similarity between the current scene and each of the historical scenes.

In a possible implementation, the determining a historical scene whose similarity with the current scene satisfies a set condition includes:

determining a historical scene whose similarity with the current scene is greater than a similarity threshold; or determining N historical scenes whose similarities with the current scene are largest, N being a positive integer.

In a possible implementation, the current scene data includes at least one piece of current user scene data, current environment scene data, and current terminal scene data;

the current user scene data is used for describing information about a user using the mobile terminal when the mobile terminal currently runs, and the current user scene data includes at least one of the name, gender, age, career, mood, and education background of the user;

the current environment scene data is used for describing an environment in which the user using the mobile terminal is located when the mobile terminal currently runs, and the current environment scene data includes at least one of a time, a location, a weather condition, humidity, illumination, a sound, and a traffic condition; and the current terminal scene data is used for describing information about the mobile terminal, and the current terminal scene data includes at least one of a terminal identifier, network information, and a device type of the mobile terminal.

In a possible implementation, the current scene data group includes at least two pieces of the current scene data, and the historical scene data group includes at least two pieces of the historical scene data; and the calculating a similarity between the current scene and each of the historical scenes includes:

calculating a sub-similarity corresponding to each piece of the current scene data in the current scene data group, the sub-similarity being a similarity between the current scene data and the historical scene data belonging to a same scene data type in the historical scene data group, and the scene data type including: at least one piece of user scene data, environment scene data, and terminal scene data; adding the sub-similarity corresponding to each of the current scene data according to a weight corresponding to a scene data type to which the current scene data belongs, to obtain the similarity between the current scene and the historical scene.

In a possible implementation, the adding the sub-similarity corresponding to each of the current scene data according to a weight corresponding to a scene data type to which the current scene data belongs, to obtain the similarity between the current scene and the historical scene includes:

$$Sim(C1, C2) = \Sigma_{i=1}^{n} Sim(S_i, S_j) * p_i$$

where C1 is the current scene data group, C2 is the historical scene data group, Sim (C1, C2) is the similarity between the current scene and the historical scene, n is the number of pieces of current scene data in the current scene data group, $S_i$ is the ith piece of current scene data in the current scene data group, $p_i$ is a weight corresponding to a scene data type to which $S_i$ belongs, $S_j$ is the historical scene data belonging to a same scene data type as $S_i$ in the historical scene data group, Sim ($S_i$, $S_j$) is a sub-similarity corresponding to the current scene data, n≥2, and n is a positive integer.

In a possible implementation, the calculating a sub-similarity corresponding to each piece of the current scene data in the current scene data group includes:

calculating the sub-similarity according to the following formula when the current scene data is represented by using a value:

$$Sim(S_i, S_j) = 1 - \frac{|S_i - S_j|}{S_j}$$

where Sim ($S_i$, $S_j$) is a sub-similarity corresponding to the current scene data, $S_i$ is the ith piece of current scene data in the current scene data group, and $S_j$ is the historical scene data belonging to a same scene data type as $S_i$ in the historical scene data group.

In a possible implementation, the calculating a sub-similarity corresponding to each piece of the current scene data in the current scene data group includes:

calculating the sub-similarity according to the following formula when the current scene data is represented by using an interval:

$$Sim(S_i, S_j) = 1 - \frac{|r_i^s - r_j^s|}{2r_j^s} - \frac{|r_i^e - r_j^e|}{2r_j^e}$$

where Sim ($S_i$, $S_j$) is a sub-similarity corresponding to the current scene data, $S_i$ is the ith piece of current scene data in the current scene data group, $S_j$ is the historical scene data belonging to a same scene data type as $S_i$ in the historical scene data group, $S_i \in [r_i^s, r_i^e]$, $S_j \in [r_j^s, r_j^e]$, $r_i^s$ is a minimum value of $S_i$, $r_i^e$ is a maximum value of $S_i$, $r_j^s$ is a minimum value of $S_j$, and $r_j^e$ is a maximum value of $S_j$.

In a possible implementation, the calculating a sub-similarity corresponding to each piece of the current scene data in the current scene data group includes:

calculating the sub-similarity according to the following formula when the current scene data is represented by using coordinates:

$$Sim(S_i, S_j) = 1 - \sqrt{(x_i - x_j)^2 + (y_i - y_j)^2}$$

where Sim ($S_i$, $S_j$) is a sub-similarity corresponding to the current scene data, $S_i$ is the ith piece of current scene data in the current scene data group, $S_j$ is the historical scene data belonging to a same scene data type as $S_i$ in the historical scene data group, and $S_i = (x_i, y_i)$, $S_j = (x_j, y_j)$.

In a possible implementation, the determining a prediction application corresponding to the current scene according to historical applications corresponding to N historical scenes whose similarities are largest includes:

determining recommended weights of the historical applications corresponding to the historical scenes according to the similarities respectively corresponding to the N historical scenes;

obtaining a current application already in a running state;

determining an associated startup probability of each of the historical applications relative to the current application, the associated startup probability being used for representing a probability of performing associated startup on the historical application in a running process of the current application; and determining, in the N historical applications, P historical applications whose recommended weights and corresponding associated startup probabilities have the largest products as the prediction applications, P being an integer greater than or equal to 1.

In a possible implementation, the obtaining a current scene data group corresponding to a current scene further includes:

collecting an original scene data group corresponding to the current scene, the original scene data group including at least one piece of original scene data for describing the current running scene; and preprocessing the original scene data in the original scene data group by using a predetermined algorithm, to generate the current scene data group corresponding to the current scene, the predetermined algorithm being used for performing at least one of data cleaning, data integration, data reduction, and data transformation on the original scene data;

and/or collecting an original scene data group corresponding to the current scene, the original scene data group including at least one piece of original scene data for describing the current running scene; and preprocessing the original scene data in the original scene data group by using a semantic analysis method, to generate the current scene data group corresponding to the current scene.

In a possible implementation, before the inputting the current scene data group and each of the historical scene data groups into a similarity model, the method further includes:

obtaining at least one group of historical scene samples, each group of the historical scene samples including the historical scene data respectively corresponding to two of the historical scenes and a scene similarity score between the two historical scenes, the scene similarity score being calibrated according to a similarity between historical applications corresponding to the two historical scenes; and training an initial similarity model according to the historical scene samples, to obtain the trained similarity model, the initial similarity model including at least one scene data type and an initial weight corresponding to each scene data type.

In a possible implementation, the method further includes:

determining an actually started-up application in the current scene; and updating the weight corresponding to each scene data type in the similarity model according to the current scene data group and the actually started-up application when the actually started-up application is different from the prediction application.

An embodiment of this application further provides a storage medium, configured to store program code, the program code being used for performing any implementation in the startup resource loading method in the foregoing embodiments.

An embodiment of the present disclosure further provides a computer program product including an instruction, when run on a computer, causing the computer to perform any implementation in the startup resource loading method in the foregoing embodiments.

It should be noted that when the startup resource loading apparatus provided in the foregoing embodiments loads a startup resource, only divisions of the foregoing functional modules are described by using an example. During actual application, the foregoing functions may be allocated to and completed by different functional modules according to requirements, that is, the internal structure of the mobile terminal is divided into different functional modules, to complete all or some of the foregoing described functions. Besides, embodiments of the startup resource loading method and the startup resource loading apparatus provided in the foregoing embodiments belong to a same idea. Refer to the method embodiments for details of a specific implementation process. Details are not described herein.

The sequence numbers of the foregoing embodiments of this application are merely for description purpose but do not indicate the preference of the embodiments.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A method for preloading resources for applications in a terminal device, comprising:

obtaining, by processing circuitry of the terminal device, a current data group that includes one or more attributes of a current running scene at the terminal device, the one or more attributes for the current running scene including at least one user attribute, the at least one user attribute including at least one of a gender, an age, a career, a mood, and an education background of a user of the terminal device;

obtaining, by the processing circuitry, historical data groups respectively corresponding to a plurality of historical scenes, each historical data group of the historical data groups comprising attributes of a historical scene at the terminal device that correspond to the one or more attributes of the current running scene;

calculating, by the processing circuitry, similarities between each of the historical data groups and the current data group;

determining, by the processing circuitry, a historical scene from the plurality of historical scenes based on the similarities between each of the historical data groups and the current data group;

determining, by the processing circuitry, a potential application for the current running scene, the potential application being executed in the determined historical scene; and loading, by the processing circuitry, a resource for the potential application into a memory of the terminal device, wherein calculating the similarities between each of the historical data groups and the current data group includes:

respectively calculating sub-similarities between at least two attributes of the historical data groups and corresponding attributes of the current running scene, and calculating a weighted sum of the sub-similarities of a respective historical data group to determine a similarity between the current data group and the respective historical data group.

2. The method according to claim 1, further comprising respectively calculating the similarities between each of the historical data groups and the current data group based on a similarity model.

3. The method according to claim 2, further comprising:
obtaining at least one historical scene sample pair, a historical scene sample pair comprising historical data groups respectively corresponding to two historical scenes and a similarity value that is calculated according to a similarity of historical applications executed at the two historical scenes; and
training an initial similarity model according to the at least one historical scene sample pair, to obtain the similarity model.

4. The method according to claim 2, further comprising:
receiving a signal indicative of an application that is started in the current running scene; and
updating weights in the similarity model according to the current data group and the application when the application is different from the potential application.

5. The method according to claim 1, further comprising at least one of:
selecting, from the plurality of historical scenes, a subset of the historical scenes with corresponding historical data groups having similarities greater than a threshold; and
selecting N historical scenes with the corresponding historical data groups having largest similarities to the current data group, N being a positive integer.

6. The method according to claim 1, wherein
the current data group further includes at least one attribute from environment attributes and terminal device attributes;
the environment attributes comprise at least one of a time, a location, a weather condition, humidity, illumination, a sound, and a traffic condition for the terminal device; and
the terminal device attributes comprise at least one of a terminal identifier, network information, and a device type of the terminal device.

7. The method according to claim 1, further comprising:
calculating the weighted sum according to:

$$Sim(C1,C2)=\Sigma_{i=1}^{n} Sim(S_i,S_j)*p_i$$

wherein C1 denotes the current data group, C2 denotes the respective historical data group, Sim (C1, C2) denotes the similarity between the current data group and the respective historical data group, n denotes a number of attributes in the current data group, $S_i$ denotes an ith attribute in the current data group, $p_i$ denotes a weight corresponding to the ith attribute, $S_j$ denotes corresponding attribute in the respective historical data group to the ith attribute, Sim ($S_i$, $S_j$) denotes a sub-similarity of the ith attribute, n≥2, and n is a positive integer.

8. The method according to claim 1, further comprising:
calculating, when an attribute is represented by a value, a sub-similarity according to:

$$Sim(S_i, S_j) = 1 - \frac{|S_i - S_j|}{S_j}$$

wherein $S_i$ denotes an ith attribute in the current data group, $S_j$ denotes a corresponding attribute in the respective historical data group to the ith attribute, Sim ($S_i$, $S_j$) denotes the sub-similarity of the ith attribute in the current data group to the corresponding attribute in the respective historical data group.

9. The method according to claim 1, further comprising:
calculating, when an attribute is represented by a range, a sub-similarity according to:

$$Sim(S_i, S_j) = 1 - \frac{|r_i^s - r_j^s|}{2r_j^s} - \frac{|r_i^e - r_j^e|}{2r_j^e}$$

wherein $S_i$ denotes an ith attribute in the current data group and is in a range of $[r_i^s, r_i^e]$, $r_i^s$ is a minimum value of $S_i$, $r_i^e$ is a maximum value of $S_i$, $S_j$ denotes a corresponding attribute in the respective historical data group to the ith attribute and is in a range of $[r_j^s, r_j^e]$, $r_j^s$ is a minimum value of $S_j$, and $r_j^e$ is a maximum value of $S_j$, Sim ($S_i$, $S_j$) denotes the sub-similarity of the ith attribute in the current data group to the corresponding attribute in the respective historical data group.

10. The method according to claim 1, further comprising:
calculating, when an attribute is represented using coordinates, a sub-similarity according to:

$$Sim(S_i,S_j)=1-\sqrt{(x_i-x_j)^2+(y_i-y_j)^2}$$

wherein $S_i$ denotes an ith attribute in the current data group and has coordinates ($x_i$, $y_i$), $S_j$ denotes a corresponding attribute in the respective historical data group to the ith attribute and has coordinates ($x_j$, $y_j$), and Sim ($S_i$, $S_j$) denotes the sub-similarity of the ith attribute in the current data group to the corresponding attribute in the respective historical data group.

11. The method according to claim 1, further comprising:
selecting N historical scenes with historical data groups having largest similarities to the current data group, N being a positive integer;
determining recommendation weights of N historical applications respectively associated with the N historical scenes according to the similarities respectively corresponding to the N historical scenes;
obtaining a current application already in a running state;
determining respective probabilities of the historical applications in association with the current application, a probability of a historical application representing a probability of performing a startup of the historical application in a running process of the current application; and
determining, from the N historical applications, P historical applications with largest products of the recommended weights and the corresponding probabilities, P being an integer greater than or equal to 1.

12. The method according to claim 1, further comprising:
generating the current data group based on collected data of the current running scene at the terminal device using at least one of data cleaning, data integration, data reduction, data transformation and semantic analysis.

13. An electronic device, comprising:
a memory configured to be loaded with resources for applications to be executed at the electronic device; and
processing circuitry configured to:
  obtain a current data group that includes one or more attributes for a current running scene at the electronic device, the one or more attributes for the current running scene including at least one user attribute, the at least one user attribute including at least one of a gender, an age, a career, a mood, and an education background of a user of the terminal device;
  obtain historical data groups respectively corresponding to a plurality of historical scenes, each historical data group of the historical data groups comprising attributes of a historical scene at the electronic device that correspond to the one or more attributes of the current running scene;
  calculate similarities between each the historical data groups and the current data group;
  determine a historical scene from the plurality of historical scenes based on the similarities between each of the historical data groups and the current data group;
  determine a potential application for the current running scene, the potential application being executed in the determined historical scene; and
  load a resource for the potential application into the memory of the electronic device,
  wherein to calculate the similarities between each of the historical data groups and the current data group the processing circuitry is further configured to:
  respectively calculate sub-similarities between at least two attributes of the historical data groups and corresponding attributes of the current running scene, and calculate a weighted sum of the sub-similarities of a respective historical data group to determine a similarity between the current data group and the respective historical data group.

14. The electronic device according to claim 13, wherein the processing circuitry is configured to:
  respectively calculate the similarities between each of the historical data groups and the current data group based on a similarity model.

15. The electronic device according to claim 13, wherein the processing circuitry is configured to:
  select, from the plurality of historical scenes, a subset of the historical scenes with corresponding historical data groups having similarities greater than a threshold; or
  select N historical scenes with the corresponding historical data groups having largest similarities to the current data group, N being a positive integer.

16. The electronic device according to claim 13, wherein:
the current data group further includes at least one attribute from environment attributes and terminal device attributes;
the environment attributes comprise at least one of a time, a location, a weather condition, humidity, illumination, a sound, and a traffic condition for the terminal device; and
the terminal device attributes comprise at least one of a terminal identifier, network information, and a device type of the terminal device.

17. The electronic device according to claim 13, wherein the processing circuitry is configured to:
  select N historical scenes with historical data groups having largest similarities to the current data group, N being a positive integer;
  determine recommendation weights of N historical applications respectively associated with the N historical scenes according to the similarities respectively corresponding to the N historical scenes;
  obtain a current application already in a running state;
  determine respective probabilities of the historical applications in association with the current application, a probability of a historical application representing a probability of performing a startup of the historical application in a running process of the current application; and
  determine, from the N historical applications, P historical applications with largest products of the recommended weights and the corresponding probabilities, P being an integer greater than or equal to 1.

18. A non-transitory computer-readable medium storing instructions which when executed by a computer cause the computer to perform a method comprising:
  obtaining a current data group that includes one or more attributes of a current running scene at the computer, the one or more attributes for the current running scene including at least one user attribute, the at least one user attribute including at least one of a gender, an age, a career, a mood, and an education background of a user of the terminal device;
  obtaining historical data groups respectively corresponding to a plurality of historical scenes, each historical data group of the historical data groups comprising attributes of a historical scene at the computer that correspond to the one or more attributes of the current running scene;
  calculating similarities between each of the historical data groups and the current data group;
  determining a historical scene from the plurality of historical scenes based on the similarities between each of the historical data groups to the current data group;
  determining a potential application for the current running scene, the potential application being executed in the determined historical scene; and
  loading a resource for the potential application into a memory of the computer,
  wherein calculating the similarities between each of the historical data groups and the current data group includes:
  respectively calculating sub-similarities between at least two attributes of the historical data groups and corresponding attributes of the current running scene, and
  calculating a weighted sum of the sub-similarities of a respective historical data group to determine a similarity between the current data group and the respective historical data group.

* * * * *